(12) United States Patent
Knight

(10) Patent No.: US 8,292,334 B2
(45) Date of Patent: Oct. 23, 2012

(54) FLARED CONE FITTING

(75) Inventor: Colin Knight, Beccles (GB)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 13/040,694

(22) Filed: Mar. 4, 2011
(Under 37 CFR 1.47)

(65) Prior Publication Data

US 2011/0148104 A1    Jun. 23, 2011

Related U.S. Application Data

(63) Continuation of application No. 11/355,063, filed on Feb. 15, 2006.

(60) Provisional application No. 60/653,446, filed on Feb. 16, 2005.

(51) Int. Cl.
*F16L 13/14* (2006.01)
(52) U.S. Cl. ..................... 285/386; 285/382.4
(58) Field of Classification Search ........... 285/368, 285/388, 387, 354, 353, 384, 256
See application file for complete search history.

(56) References Cited

U.S. PATENT DOCUMENTS

| | | | |
|---|---|---|---|
| 3,191,973 A | 6/1965 | Guarnaschelli | |
| 4,469,356 A | 9/1984 | Duret et al. | |
| 5,002,316 A | 3/1991 | Chohan | |
| 5,314,211 A | 5/1994 | Landhuis | |
| 6,296,283 B1 * | 10/2001 | Dietzel | 285/256 |
| 6,327,771 B1 | 12/2001 | Anglin et al. | |
| 2004/0104572 A1 | 6/2004 | Gilbreath | |

FOREIGN PATENT DOCUMENTS

| | | |
|---|---|---|
| DE | 3719585 A1 | 1/1988 |
| WO | 02084159 A | 10/2002 |

* cited by examiner

*Primary Examiner* — David E Bochna
(74) *Attorney, Agent, or Firm* — J. A. Thurnau, Esq.; P. N. Dunlap, Esq.

(57) ABSTRACT

An improved flared cone fitting of the type having a male portion and a female portion having a tube, an inverted conical annulus, a nut, and a joinder portion, may be disclosed. It is improved by the joinder portion including a back-side annular face, which may define a void. The joinder portion may also include an abutment intended to contact a shoulder of a fitting nut and properly direct forces exerted on the nut.

6 Claims, 4 Drawing Sheets

FLARED CONE FITTING

CROSS REFERENCE TO RELATED APPLICATIONS

This is a continuation of U.S. patent application Ser. No. 11/355,063, filed Feb. 15, 2006, entitled FLARED CONE FITTING, which claims priority to U.S. Provisional Patent Application Ser. No. 60/653,446 filed Feb. 16, 2005 entitled FLARED CONE FITTING, which are incorporated herein by reference for all purposes.

BACKGROUND OF THE INVENTION

1. Field of the Invention

The present invention generally relates to hydraulic hose fittings. More particularly, it relates to flared cone fittings and more specifically, the present invention relates to improved female portions of flared cone terminations, for tube and hose fittings.

2. Description of the Prior Art

Flared cone fittings are known in the art. Typically, the female portion forms part of a separate fitting or connector that connects a hydraulic hose to a machine, equipment, or fixture or is fixed upon or is a part of a tube that connects the tube to a machine, equipment, or fixture.

As depicted in prior art FIGS. 1 and 2, a female portion of flared cone fitting 100 or 200 includes tube 101, nut 102 or 202, bore 103, and hose stem 104. Hose stem 104 may include ferrule collar 106, hose stop 107, and barbs 109. Tube 101 may be bent as depicted or straight. The end of tube 101 is flared to the point of presenting an inverted conical annulus or cone face 115 at the tube's open end. The inverted conical annulus has an inside diameter substantially equal to the inside diameter of the tube from which the annulus is created.

In one form of the female portion, depicted in prior art FIG. 1 as 110, inverted conical annulus 115 is unsupported by any additional reinforcement. Rather, it merely has an interior shape that corresponds to the exterior shape of the male portion of the coupling, and an exterior shape that corresponds to the interior shape of nut 102. The nut squeezes the conical annulus between itself and the male portion (see FIG. 1). For connecting the female portion to the male portion, a nut having internal threads 120 covering a portion of its interior and having reduced diameter unthreaded portion 121, corresponding to the exterior surface of the inverted conical annulus covering the remaining portion of the nut fits over the tube and about the inverted conical annulus. The male portion has a coned face and external threads proximate the face. Upon connection, the nut is threaded over the external threads of the male portion. The threading action reduces the distance between the coned face and the nut, whereby the inverted conical annulus and the coned face are brought into sealing contact.

When the nut is applied, the inverted conical annulus is secured against the exterior of the male portion, but without give or flexibility. Problematically, tightening of the nut results in a tendency of the nut to seize upon the exterior surface of the inverted conical annulus. In this condition, the torque exerted upon the nut by a wrench is absorbed, interfering with continued tightening of the connection. Application of additional torque in an attempt to overcome the seized condition may merely damage the various components without improving the seal. These problems are not conducive to establishing a leak-tight seal.

In another form of the female portion, depicted in prior art FIG. 2 as 210, inverted conical annulus 115 is supported by collar or sleeve 222, which is fitted upon the tube, in a manner well known in the art, against the exterior surface of the inverted conical annulus. The collar includes abutment 225, orthogonal to the tube. The nut is shaped with corresponding shoulder 221, as well as threads 220. This form is more resistant to seizing, because the forces associated with bringing the inverted conical annulus and the coned face together are mostly devoid of other than axial components. Problematically, this form involves greater cost and complexity. Further, this form also produces a connection without give or flexibility.

Discussion of each of these two forms can be found in Society of Automotive Engineers standards SAE J514 REV. JUN1998 and J533 REV. AUG1996, both of which are incorporated herein by reference.

Both of these joints have significant disadvantages in both production and operation. First, these styles of fittings have a tendency to loosen, leak, and fail under certain conditions. When the female portion is twisted in relation to the male portion of the fitting, such as under the influences of impacts upon the fitting or vibration, the friction between the female portion and the nut can cause the nut to turn and to loosen. This situation is predominantly related to fittings where the tube is bent as depicted in prior art FIGS. 1 and 2, but also applies when the tube is straight. It is believed that the lack of give or flexibility of the connection exacerbates this tendency to loosen. Second, this tendency to loosen can lead an installer of the fitting being encouraged to use additional torque on the fitting to overcome this deficiency, which can lead to failure of the various components, particularly the nut. As stated, the second of the two forms (200) suffers the additional disadvantage of requiring a separate sleeve (222) to be produced and fitted to the tube, adding to the cost and complexity of producing female portion 210 of the flared cone fitting.

Accordingly, there is a continuing need for a flared cone fitting, including a female portion, of simplified construction that has an improved resistance to leakage brought on by loosening caused by twisting of the tube or brought on by too much torque applied to the nut.

SUMMARY

The present invention is directed to a systems and methods which employ a flared cone fitting, including a female portion, of simplified construction that provides an improved resistance to leakage brought on by loosening caused by twisting of the tube, or brought on by excessive torque applied to the nut.

An object of the present invention is to provide a flared cone fitting, including a female portion, of simplified construction.

A further object of the present invention is to provide a flared cone fitting, including a female portion, having improved resistance to leakage brought on by loosening caused by twisting or vibration of the tube or over tightening of the connection.

To these ends, embodiments of the present invention are directed to an improved flared cone fitting that includes a male portion and a female portion. The female portion has a tube, an inverted conical annulus, a nut, and a joinder portion. Preferably, the joinder portion includes a back-side annular face, which may define a void. The joinder portion may also include an abutment intended to contact a shoulder of a fitting nut and properly direct forces exerted on the nut.

More specifically embodiments of the present invention may take the form of a flared cone fitting that includes a male portion and a female portion adapted to sealingly mate with the male portion, the female portion preferably includes a tube; defining a joinder portion. The joinder portion might comprise an inverted conical annulus including a back-side annular face. The tube of various embodiments has an inside diameter with an extended peripheral limit having a diameter corresponding to the tube inside diameter. The joinder portion may further comprise a void having a portion extending radially beyond the extended peripheral limit and axially interior to the inverted conical annulus. Preferably, the void enables the female portion to flex relative to the male portion without loosening a nut joining the male portion and the female portion. To this end the void might reduce friction between the tube and a nut joining the male portion and the female portion, whereby the reduction in friction reduces loosening of the nut. Preferably the joinder portion is integral, or unitary, and might comprise an abutment extending substantially orthogonal from the tube. The nut joining the male portion and the female portion might include an internal shoulder that orthogonally contacts the abutment.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 3:
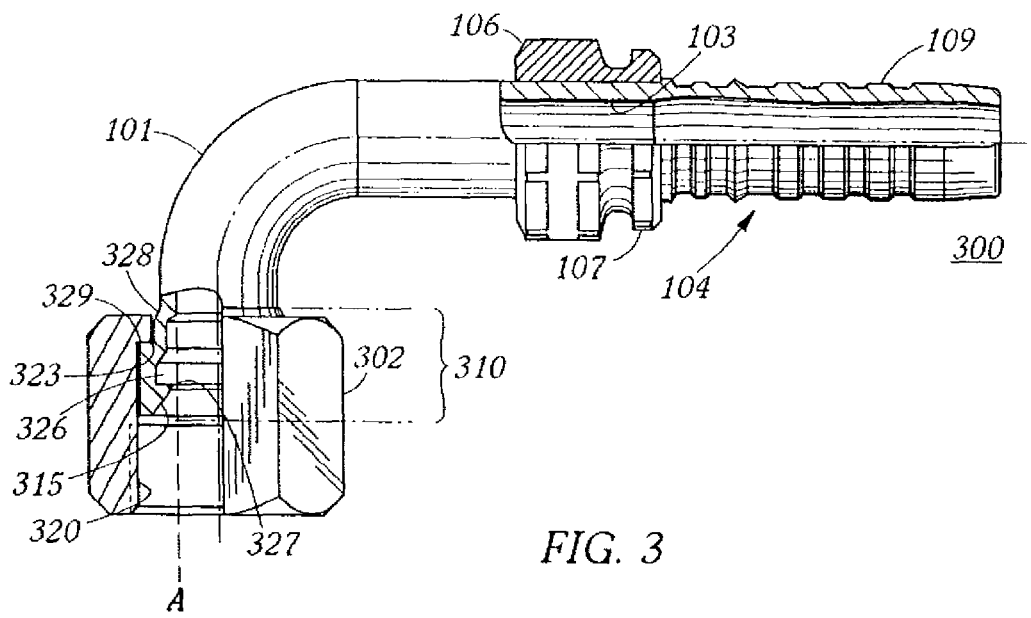
FIG. 3 is an elevation view with one quarter cut away of a female end of a hydraulic fitting including an embodiment of a flared cone fitting in accordance with the present invention.

Referring to FIG. 3, an embodiment of female portion of flared cone fitting 300 is depicted. The female portion of flared cone fitting 300 includes joinder portion 310, tube 101, nut 302, bore 103, and hose stem 104. Hose stem 104 may include ferrule collar 106, hose stop 107, and barbs 109. Generally, joinder portion 310 is a portion of fitting 300 adapted to be substantially radially within nut 302. For the embodiment depicted, joinder portion 310 includes camming portion 328 and abutment or axial restraining portion 329 extending substantially orthogonally to tube 101, inverted conical annulus or cone face 315, void 326, and back-side annular face 327.

Figure 4A:
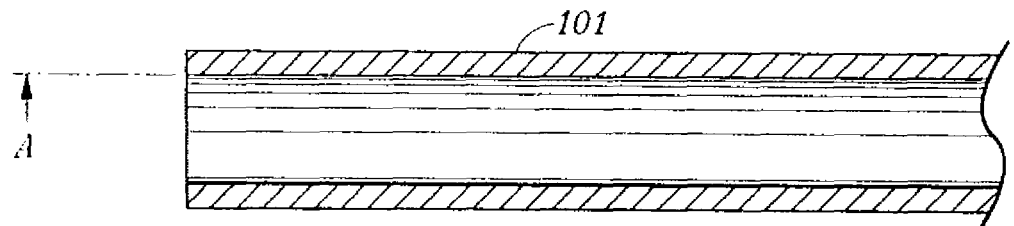
FIGS. 4a through 4e are generally cross-sectional elevation views depicting progressive forming of an embodiment of a flared cone fitting in accordance with the present invention.
Figure 4B:
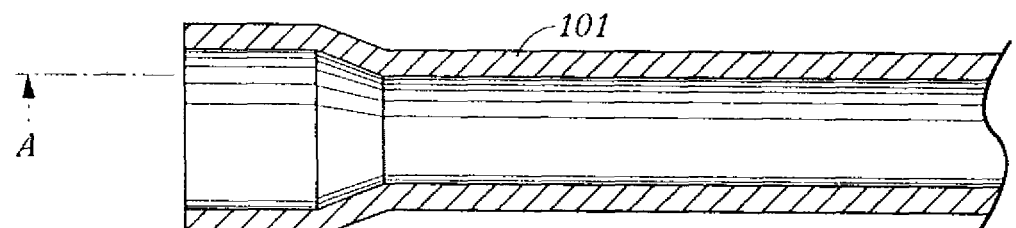
Figure 4C:
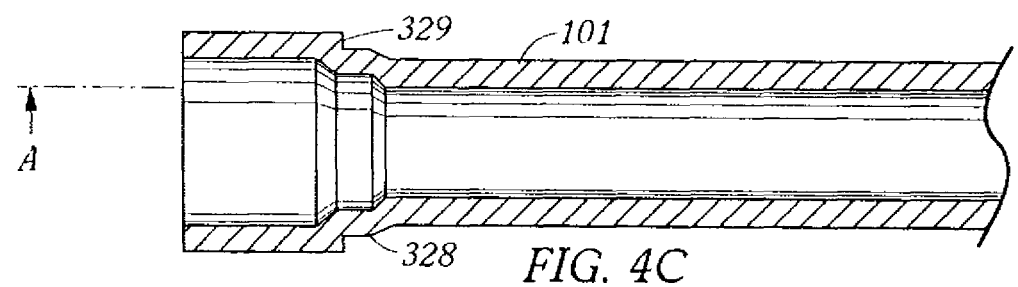
Figure 4D:
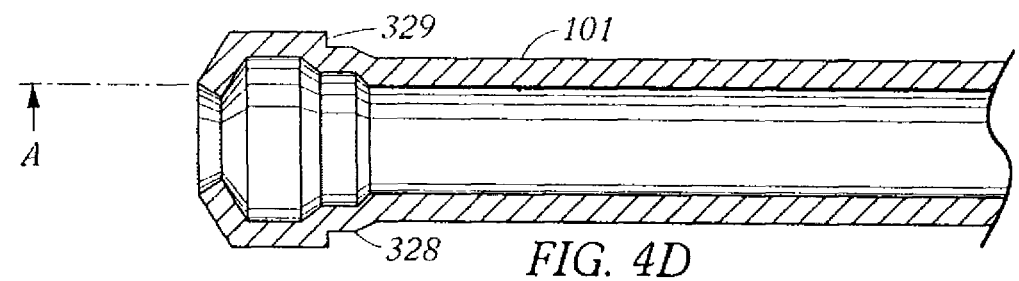
Figure 4E:
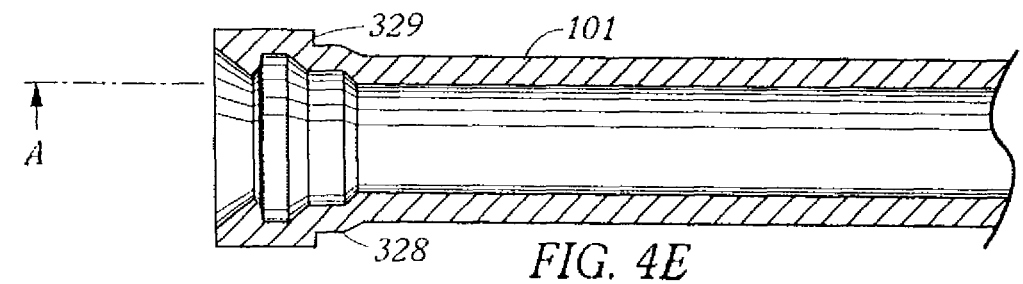
Figure 5:
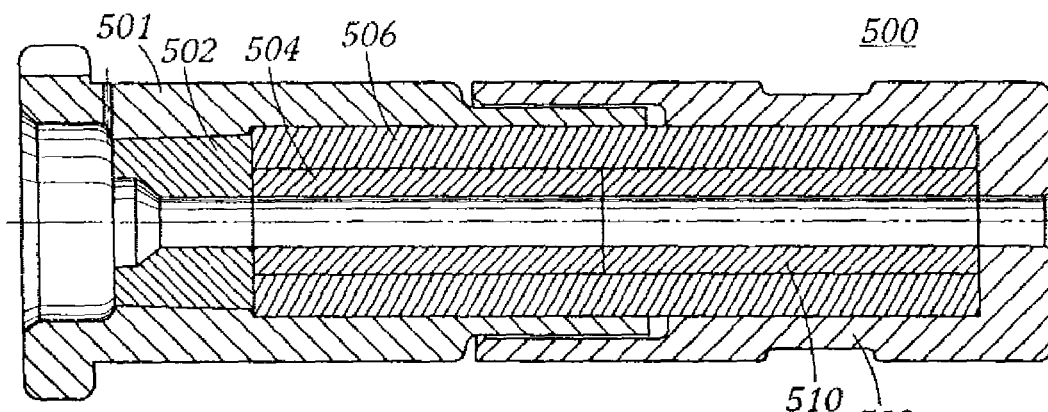
FIG. 5 is of a forming press, such as may be used to form an embodiment of a female hydraulic fitting in accordance with the present invention.
Figure 6:
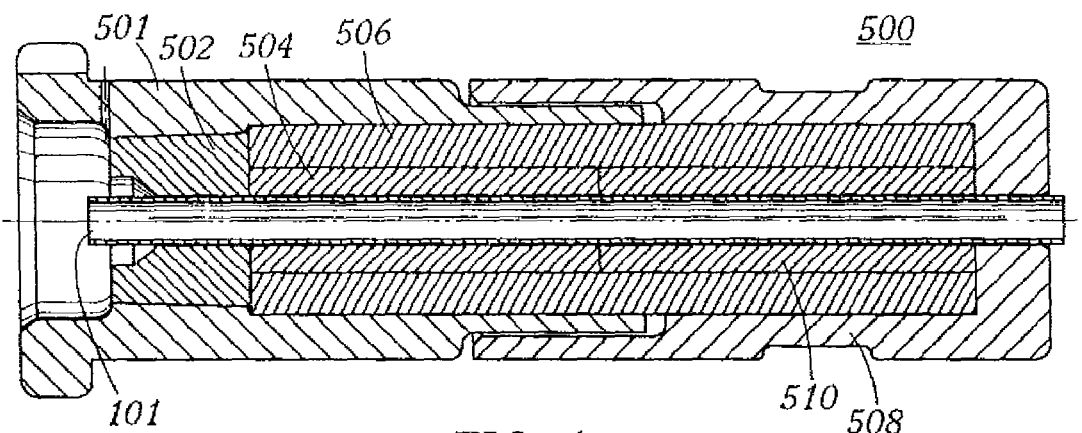
FIG. 6 is a generally cross-sectional elevation view of the forming press of FIG. 6, including a tube to be formed into an embodiment of a female hydraulic fitting in accordance with the present invention.
Figure 7:
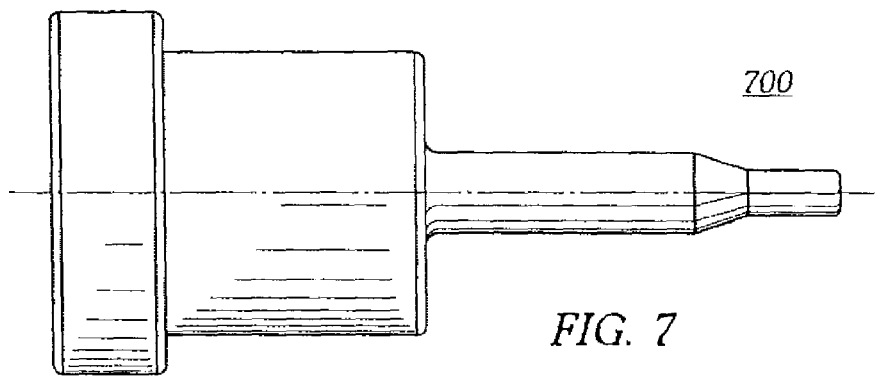
FIG. 7 is an elevation of a first punch to be used in conjunction with the press of FIGS. 5 and 6 to form an embodiment of a female hydraulic fitting in accordance with the present invention.
Figure 8:
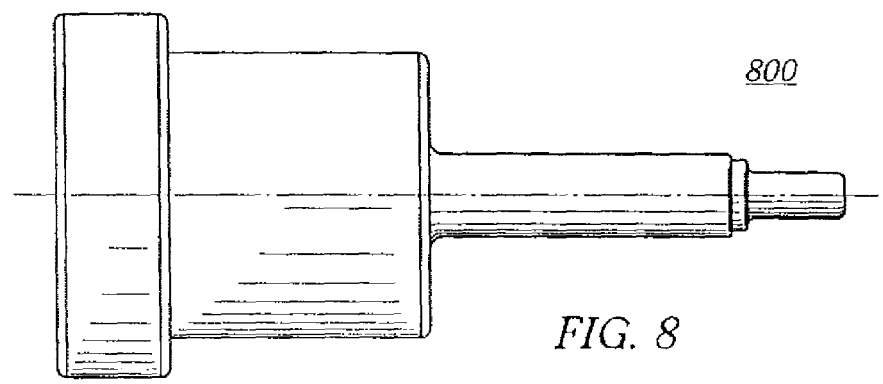
FIG. 8 is an elevation of a second punch to be used in conjunction with the press of FIGS. 5 and 6 to form an embodiment of a female hydraulic fitting in accordance with the present invention.
Figure 9:
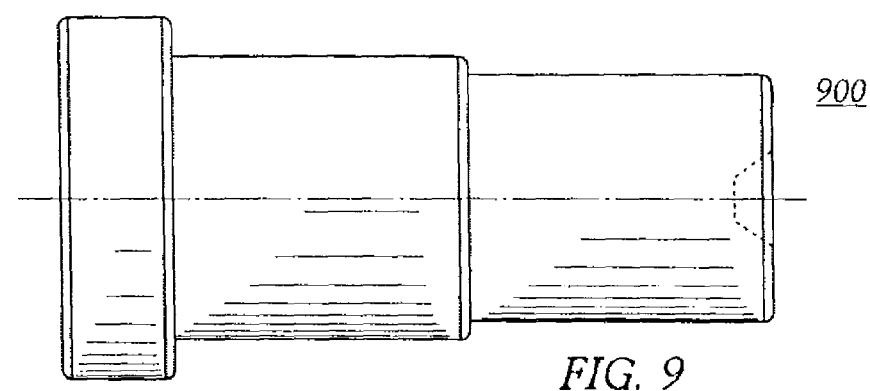
FIG. 9 is an elevation of a third punch to be used in conjunction with the press of FIGS. 5 and 6 to form an embodiment of a female hydraulic fitting in accordance with the present invention; and, FIG. 10 is an elevation of a fourth punch to be used in conjunction with the press of FIGS. 5 and 6 to form an embodiment of a female hydraulic fitting in accordance with the present invention.
Figure 10:
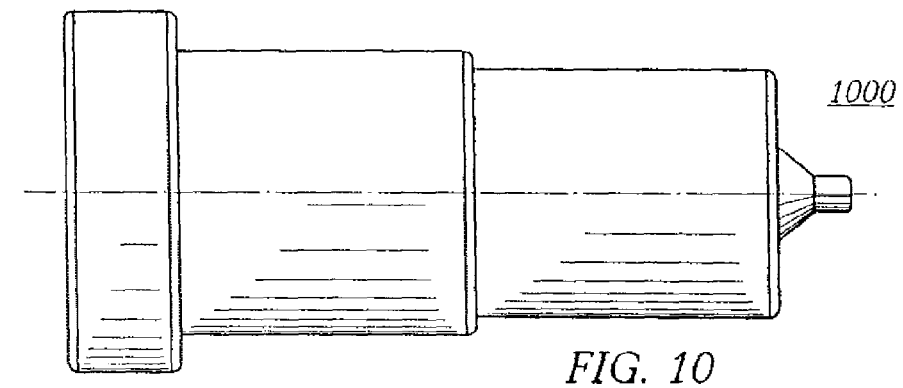

Joinder portion 310 can be formed by various tube forming methods known in the art. However an approach that is well suited to produce such parts, where the parts are of the configuration of FIG. 3, and done on a volume basis, is by progressive die kilning. Referring to FIGS. 4 through 10, that process and tools that may be used to carry out the process are generally depicted. However, the overall press technique and equipment is well known in the art and not fully depicted nor described here. Still, details specific to producing joinder portion 310 of flared cone fitting 300 of the present invention are described. The general configuration of the press may be as follows. The press may have six vertical rotating die stations, such as die 500, one of which is depicted in FIG. 5. Each die station holds interchangeable dies such as die 500. Each die has an integral ejection rod (not depicted) that may be used to set the length of the part and to eject the finished part. The ejection rods can either be of fixed length or be adjusted for length with inserts. There may also be four rams (not depicted) with first through fourth punches 700, 800, 900 and 1000, of FIGS. 7 through 10 respectively, mounted to each ram. An auto lube spray (not depicted) may also be attached at a load station.

Each die 500 preferably includes upper die shell 501, form insert 502, upper tube insert 504, compression tube 506, lower die shell 508, and lower tube insert 510. Each die is generally identical and has replaceable components (i.e., form insert 502 of each die can be replaced). Upper die shell 501, upper tube insert 504, compression tube 506, lower die shell 508, and lower tube insert 510 are non-forming areas of the die. These areas are sized slightly larger than tube 101 that is inserted. Tube 101 will expand to fill this over sized area during the forming process and will foreshorten commensurately. Note in FIG. 6 how some of tube 101 extends beyond form insert 502.

At the first station, tube 101 is loaded into die 500. The next four stations may employ first through fourth punches 700,

800, 900, and 1000, respectively, and may be capable of applying twenty-five tons of force each. Stations one and two may each have a stripper plate (not depicted) to separate tube 101 from the respective punch 700 through 1000 after forming.

In operation, each size of tubing is cut to length, wire brush deburred, and washed to eliminate extraneous metal particles, all prior to being introduced to the press. The press is prepared with the correct size of die 500, first through fourth punches, 700 through 1000 respectively, stripper plates (not depicted), ejection rods (not depicted) and loader rod (not depicted) are mounted. An auto loader may be adjusted for the corresponding size tubing. A cut and deburred tube 101 (such as shown in FIG. 4A) is placed over a die 500. A small amount of forming oil may be sprayed over tube 101. Tube 101 is driven into die 500 until the ejection rod stops its travel. The loader rod retracts. Die 500 is rotated under first punch 700. This is station two where tube 101 is primarily expanded near its opening as depicted in FIG. 4b. Camming portion 328 is also produced a station two. Camming portion 328 helps to properly position nut 302 when nut 302 is being prepared for threading upon the male portion (not depicted). Camming portion 328 has the convex curved shape depicted in FIG. 3, for this embodiment. However, other shapes such as the angular shape depicted in FIG. 4c through 4e, conical, or concave curved are contemplated.

First punch 700 advances until a fixed stop is contacted. First punch 700 retracts. Die 500 is rotated under second punch 800. This is station three where the camming portion 328 of tube 101 is defined as depicted in FIG. 4c. Second punch 800 advances until a fixed stop is contacted. Second punch 800 retracts. Die 500 is rotated under third punch 900. This is station four where joinder portion 310 of tube 101 is folded at the area expanded by station one over to 45 degrees as depicted in FIG. 4d. Third punch 900 advances until it bottoms out against die 500. Third punch 900 retracts. Die 500 is rotated under fourth punch 1000. This is station five, which continues folding and forming inverted conical annulus or cone face 315. The inside diameter of inverted conical annulus or cone face 315 is formed simultaneously. Fourth punch 1000 advances until it bottoms out against die 500. Fourth punch 1000 retracts. Die 500 is rotated over an ejection cylinder (not depicted). This is the final station where tube 101 is ejected. The ejection cylinder advances, advancing an ejection rod and formed part until a signal is received. The formed part is now out of die 500 and exposed. A blow-off (not depicted) activates by blowing off the exposed, formed part. The ejection cylinder retracts. The die is rotated under the loading station.

The above operation is listed for one die station. All six die stations are in a circle and as each die station is rotated, all other stations rotate simultaneously. The four punches 700 through 1000, respectively, simultaneously advance on four die stations while loading and ejection is also simultaneously being performed. Each punch, 700 through 1000 respectively, has a separate configuration and has replaceable components at critical forming areas of the punch that contact tube 101 during the forming process.

Hose stem 104 may be formed upon tube 101 at the end opposite of inverted conical annulus or cone face 315. Tube 101 may be plated. Nut 302 may be placed about tube 101. Tube 101 may be bent. Finally, ferrule collar 106 may be staked in place.

Commonly, hose stem 104 is inserted in the open end of a flexible hose (not depicted), and a ferrule (not depicted) is crimped about that hose end as well as ferrule collar 106 to secure fitting 300 to the hose. For those applications not involving attachment to a flexible hose (not depicted), hose stem 104 can be omitted. In such a case, tube 101 may extend the distance that would otherwise be completed by the flexible hose.

Figure 2:
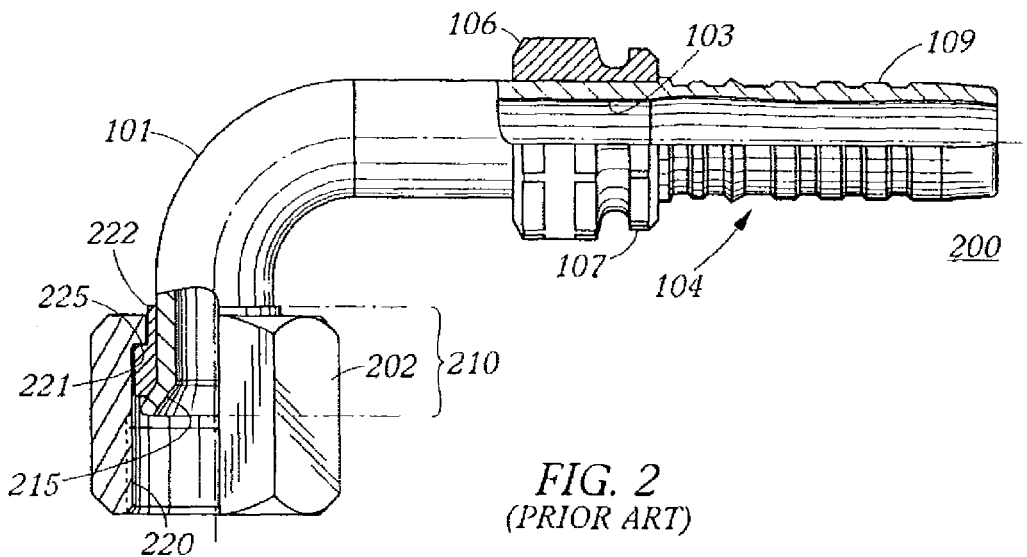
FIG. 2 is an elevation view with one quarter cut away of a prior art female end of a hydraulic fitting.

Note that producing joinder portion 310 of the present invention does not include creating and affixing a separate backing collar or sleeve, such as sleeve 222 of FIG. 2, thereby reducing cost and complexity.

More significantly, however, void 326 is preferably created. Void 326 is over the volume between extended peripheral limit A (FIGS. 4A-4E), the inside surface of joinder portion 310, and axially interior of back-side annular face 327. Extended peripheral limit A is that conceptual surface that extends linearly from the portion of tube 101 that was not altered by either the joinder portion 310 formation or by the bending of tube 101. To extend radially beyond extended peripheral limit A is to be of a greater radius.

Figure 1:
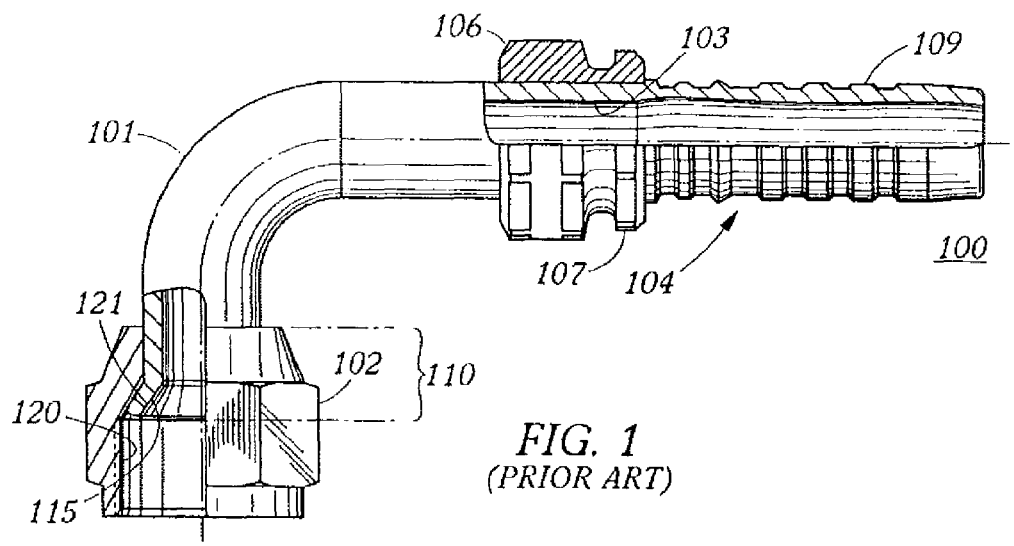
FIG. 1 is an elevation view with one quarter cut away of a prior art female end of a hydraulic fitting.

Void 326 alters the response of nut 302 when female portion of flared cone fitting 300 is twisted in relation to the male portion of the fitting. When female portion 100 or 200 of FIGS. 1 and 2 are struck so as to twist female portion 100 or 200 in relation to male portion or vibrated nut 102 or 202 tends become loosened from the male portion. If the loosening progresses far enough, the fitting can leak. Thus, the connection experiences a failure. Void 326 decreases this tendency to loosen. Void 326 may allow some give or flexure in the joint, which in turn, reduces the friction between tube 101 and nut 302 under such conditions. The reduction of friction reduces the tendency of nut 302 to loosen under the described conditions.

Inverted conical annulus 315 of the instant invention is accompanied by back-side annular face 327 defining void 326. Further, nut 302 might define internal shoulder 323 which works against abutment 329 of joinder portion 310. Improved direction of forces caused by the orthogonality of abutment 329 and shoulder 23 in conjunction with the reduction of friction caused by void 326 may result in unsurpassed resistance to leaking and failure by joints employing the present invention. Further, nut 302 seizing upon the exterior surface of the inverted conical annulus 315, similar to found in the prior art, may be avoided.

The present invention provides a flared cone fitting that is at once less costly and complex to produce; exhibits an improved resistance to loosening in its working environment due to blows, vibration, or other events that may cause twisting of the fitting and ultimate leakage and failure of the fitting; and exhibits improved resistance to failure brought on by seizing during tightening of the nut.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A female portion of a fitting, comprising:

a tube end comprising:

an inverted conical annulus comprising a generally interior surface formed at least in part by an outside of said tube end being turned radially inward;

an axially restraining portion;

an integral joinder portion, which comprises said inverted conical annulus and said axial restraining portion;

said integral joinder portion further comprises a camming portion configured to facilitate positioning of a nut when said female portion is connected to a male portion; and said camming portion further comprises a portion generally parallel to an outside diameter of said tube, at a second outside diameter which is generally larger than said outside diameter of said tube.

2. The fitting of claim 1, wherein said axial restraining portion extends Generally_orthogonally to said tube.

3. The fitting of claim 2, further comprising a void having a portion extending generally radially beyond an extended peripheral limit of said tube and generally axially interior to said inverted conical annulus.

4. The fitting of claim 3, further comprising a backside annular face which defines at least a portion of said void.

5. The fitting of claim 1, wherein said integral joinder portion is formed to further comprise a surface generally parallel to said outside diameter of said tube, generally larger than said second outside diameter.

6. The fitting of claim 1, wherein said inverted conical annulus is formed with an angle of 30-50 degrees from an outside diameter of said tube.

* * * * *